United States Patent [19]

Faust et al.

[11] Patent Number: 4,741,979

[45] Date of Patent: May 3, 1988

[54] BATTERY SEPARATOR ASSEMBLY

[75] Inventors: Marilyn A. Faust; Mary R. Suchanski, both of Rochester; Hans W. Osterhoudt, Spencerport, all of N.Y.

[73] Assignee: Eastman Kodak Company, Rochester, N.Y.

[21] Appl. No.: 864,376

[22] Filed: May 19, 1986

[51] Int. Cl.$^4$ .................. H01M 2/16; H01M 6/14
[52] U.S. Cl. .................... 429/144; 429/62; 429/197; 429/249
[58] Field of Search .............. 429/62, 142, 144, 248, 429/249, 194, 197

[56] References Cited

U.S. PATENT DOCUMENTS

| | | | |
|---|---|---|---|
| 3,983,272 | 9/1976 | Huber et al. | 428/266 |
| 4,075,400 | 2/1978 | Fritts | 429/62 |
| 4,351,888 | 9/1982 | Dampier et al. | 429/62 |
| 4,407,910 | 10/1983 | Catanzarite | 429/62 |
| 4,526,846 | 7/1985 | Kearney et al. | 429/194 |
| 4,579,792 | 4/1986 | Bruder | 429/194 |

*Primary Examiner*—John F. Niebling
*Assistant Examiner*—Steven P. Marquis
*Attorney, Agent, or Firm*—John R. Everett

[57] ABSTRACT

A separator assembly for use in batteries comprising a film bearing a thermal fuse in the form of a layer of wax coated fibers is disclosed.

13 Claims, No Drawings

BATTERY SEPARATOR ASSEMBLY

FIELD OF THE INVENTION

This invention relates to a battery separator assembly and to batteries containing the assembly.

BACKGROUND OF THE INVENTION

A battery generates electrical energy by chemical action of electrodes of opposite polarity in an electrolyte. Sometimes a battery is short circuited, causing the battery to overheat. Overheating can result in the emission of an electrolyte, vapor, or molten electrode material. In some situations, explosions may occur. Thus, battery overheating can be dangerous to the user and others in the environment in which the battery is used.

U.S. Pat. No. 4,075,400 discloses a battery, comprising a lithium anode, a $SOCl_2$ cathode and a woven electrically insulating separator. Overheating is prevented in this battery by the use of a thermal fuse. The fuse consists of a plurality of encapsulated particles containing a poisoning agent. The encapsulated particles are embedded in the fibers of the separator as particulate materials. When the battery of this patent reaches a predetermined temperature, the encapsulating materials release the poisoning agent. The released poisoning agent then deactivates the battery by shutting down current flow or combining chemically with one or more elements of the battery. The poisoning agent may be a wax.

However, tests have shown that the presence of unencapsulated particulate waxes on the separator or adjacent to a battery electrode can degrade the electrical performance of batteries. The average service life, energy delivered and peak power will be below that of batteries which include no particulated wax particles on the separator.

It is desirable to improve the performance of batteries having a thermal fuse.

SUMMARY OF THE INVENTION

The present invention provides a separator assembly for use in batteries comprising a film bearing a thermal fuse in the form of a layer of wax coated fibers.

In batteries using this separator assembly, the service life and energy delivered are not adversely affected compared to batteries of U.S. Pat. No. 4,075,400. Moreover, the thermal fuse used in the separator assembly of this invention does not require the step of encapsulating the material used as the fuse.

In a preferred embodiment, this invention makes possible a battery comprising an anode, a cathode, an electrolyte and a separator assembly according to the present invention between the anode and the cathode.

In a most preferred embodiment, batteries made possible by this invention comprise a lithium anode and a manganese dioxide ($MnO_2$) cathode.

Such batteries exhibit improved load voltage, service life and energy extracted when pulse discharged compared to similar batteries in which separators without a thermal fuse are employed. These improvements are unexpected since one skilled in the art would expect that a thermal fuse would increase internal battery resistance, thereby decreasing the electrical performance of batteries.

DETAILS OF THE INVENTION

The anode, the cathode, the separator, the thermal fuse and the technique by which they are brought together to form the battery of this invention will be described. In this description of the invention, lithium anodes and $MnO_2$ cathodes are used. It will be recognized that the separator assembly having the thermal fuse herein described will work in most batteries.

The separator assembly must be sufficiently porous to allow a continuous flow of ions between the anode and the cathode. This means that both, the thermal fuse (layer of wax coated fibers) and the film bearing the thermal fuse are porous. The materials from which the separator assembly are made must also be (a) insoluble in the electrolyte (b) electrically insulating and (c) capable of physically separating the anode and the cathode to prevent internal shorting.

A wide variety of fabrics can be used as the film layer of the separator assembly. Especially useful fabrics are non-woven polymerics such as Kiara TM 9120 or 9123 (60% polyester, 40% polyethylene, fabric density of 7 $gm/m^2$ and 14 $gm/m^2$, respectively, Chicopee Industrial Division, New Brunswick, N.J.), and Pellon polyester with a fabric density of 20.9 $gm/m^2$. This includes woven and non-woven fabrics.

The layer of waxed fibers does not form a coating over the surface of the film that closes the pores of the film. Otherwise the flow of ions which is essential to current flow will be inhibited.

Most substances which can be applied to the fibers which will melt and flow at the desired temperature can be used as the wax to form the thermal fuse.

Waxes having a melting point in the range of 30° to 200° C. preferably 50° to 150° C. will be useful. Examples of particularly useful waxes are Tissue Prep (combination of paraffin and a thermoplastic polymer, m.p. 56°-57° C., beeswax (Kodak, White, m.p. 63° C.), microcrystalline wax (Strahl & Pitsch #96, m.p. 63°-65° C.), candellila (Strahl & Pitsch, m.p. 67°-70° C.), Polywax TM 500 (Petrolite Corp., m.p. 79.9° C. by DSC), rice bran wax (Frank B. Ross Corp., m.p. 81° C. by DSC), Epolenes C-18 (95°-97° C.) and E-14 (m.p. 100° C.) (Eastman Kodak Company), Petrolite Bareco hard microcrystalline C700 (m.p. 91° C.) Petrolite Corp.) and Ross Wax 160 (Frank B. Ross Co., Inc., m.p. 143°-157° C.).

Standard coating technology can be used to apply the wax (brushing, spraying, dipping, knife coating, roller coating, electrostatic spraying, airless spray, fluidized bed, etc.)

Separator assemblies and batteries, including such assemblies, were generally constructed as follows.

A separator assembly was prepared with a 1.25 inch wide strip of non-woven polyethylene coated polyester fabric (Kiara TM 9123). The fibers of the fabric were coated with rice bran wax. Any of the previously described waxes could also be used. The wax was melted in a 200 cc, three-neck round-bottom flask by means of a heating mantle. The flask temperature was controlled in the range of 80° to 90° C. by a variable autotransformer. The wax was sprayed onto the fibers of the non-woven fabric with an air brush (14 lbs. air pressure, 15 cm distance from nozzle tip to fabric). A 6.35 mm ($\frac{1}{4}$ inch) o.d. stainless steel tube which was immersed in the molten wax served to deliver the wax to the nozzle of an air brush which was wrapped in heating tape to prevent clogging of the spray nozzle with solid wax.

The fabric traveled past the spray nozzle at a rate of 1.524 m/min (5 ft/min) by means of motor controlled delivery and wind-up rolls.

After spraying the wax onto the fabric, the wax was in particulate form on the fibers of the fabric. However the particulate wax particles, if left in this condition, would degrade battery performance. To avoid this, an infrared lamp line heater with an elliptical mirror was placed between the air brush and the wind-up roll to fuse the wax on the fabric fibers. The voltage to power the heat was controlled and the distance between the front surface of the lamp housing and the fabric was adjusted to achieve the desired fusing. When the fusing was completed, the fabric was porous although the individual fibers were wax coated. This formed the thermal fuse.

The above 3.18 cm wide strip of waxed fibers was pressure laminated to a 3.18 cm wide microporous strip of 0.025 mm thick polypropylene film (Celgard TM 2500) by simultaneously feeding the waxed fiber layer and microporous polypropylene film through a pair of polypropylene rollers to form a separator assembly comprising a thermal fuse.

In battery construction the waxed layer can face either the cathode or the anode, and in battery assembly the waxed separator may be applied either to the cathode or to the anode. In the example described herein, the waxed layer faced the anode.

The anode was essentially a two piece laminate comprised of lithium coated on a stainless steel foil current collector. A portion of the stainless steel foil is left uncoated and trimmed to form the anode terminal.

The separator assembly was pressed onto the surface of a lithium anode with the waxed fiber layer facing the lithium. The anode consisted of a strip of 0.203 mm (0.008 inch) thick lithium foil laminated to a 0.025 mm (0.001 inch) thick piece of 304 stainless steel foil with the same dimensions.

The $MnO_2$ cathode comprised a stainless steel grid current collector coated on one or both sides with a mixture of $MnO_2$, carbon and Teflon TM. A small portion of the stainless steel current collector was left uncoated and shaped at one end to function as a cathode terminal.

A complete electrode assembly was made by positioning the cathode on top of the separator attached to the anode so that the cathode terminal and the anode terminal are side by side but are not in electrical contact. The cathode, in this embodiment of the invention, is about one-half the length of the anode. The entire anode is then folded over the entire cathode to form a laminate structure in which the cathode is sandwiched between the folds of the anode.

Next, the complete electrode assembly was then accordion folded or rolled into a configuration that would essentially fill the cell space.

After checking for internal electrical shorts with an ohmmeter, three such electrode assemblies are made into a battery by first inserting the assembly into a battery case having a separate compartment for each assembly. The three electrode assemblies were then electrically connected in series. An electrolyte comprising, for example, a 70:30 volume percent solvent mixture of 4-butyrolactone and dimethoxyethane containing 1M $LiBF_4$ was added to the battery to complete a three cell 9V battery. Other electrolytes are $LiCF_3SO_3$ in a solvent mixture of propylene carbonate and dimethoxyethane or in a solvent mixture of 4-butyrolactone and dimethoxyethane.

Other useful anode materials include alkali metals (Na and K), Li-Al alloys, Li-Si alloys, Li-B alloys and the metals of Groups Ia and IIa of the periodic table of elements. Metal foils which can be used as the current collector and support include metals such as nickel, stainless steel, aluminum and titanium.

The wide variety of cathode materials which would be useful in the electrode assemblies of this invention includes, in addition to $MnO_2$, $FeS_2$, FeS, CuO, $Bi_2O_3$ and various forms of polyfluorocarbons, i.e. $(CF_x)_n$ wherein x is < 1.2, and n is some indeterminate large number.

ELECTRICAL BEHAVIOR OF THE BATTERIES OF THIS INVENTION

1. Shorting

Batteries prepared according to the above described procedure with and without separator assemblies containing a thermal fuse were shorted through a 0.04 ohm lead. The battery skin-temperature and current were monitored as a function of time during shorting. The comparative shorting data are summarized in Table I. Batteries with and without the thermal fuse had similar initial limiting currents ($I_l$) (here "limiting current" and "short circuit current" have the same meaning). This was indicative of batteries with similar power. However, the battery which contained the thermal fuse (20 gm/m² rice bran) had a maximum skin temperature (T) of 74° C., whereas the two control batteries without the thermal fuse had maximum skin temperatures of 112° C. and 108° C., respectively. The battery that contained the thermal fuse did not vent or swell. However, both control batteries swelled and vented a significant amount of electrolyte.

TABLE I

Thermal Properties of Batteries with and without a Thermal Fuse

| | Example | Control | |
|---|---|---|---|
| Separator Assembly | Kiara TM 9123 fabric with fibers coated with rice bran wax pressure-laminated to Celgard TM 2500 | Celgard TM 4510* | |
| wax loading (g/m²) | 20 | 0 | 0 |
| Shorting | | | |
| $I_l$ (A) | 2.6 | 2.5 | 2.7 |
| $T_{skin}$ maximum (°C.) | 74 | 112 | 108 |
| time (minutes) to $T_{skin}$ maximum | 7 | 13 | 11 |
| Case integrity | very slight leak | venting | venting |

*Celgard TM 4510 is Celgard TM 2500 plus a non-woven fabric layer without wax.

2. Continuous Discharge Through 90 ohms (Ω)

The continuous discharge performance of the battery containing the thermal fuse described in Table I was compared to that of four batteries made in a similar manner without the thermal fuse. Discharge was through a 90Ω load to a 6 volt cutoff. Average values of load voltage, charge extracted and energy extracted for the pair employing the thermal fuse were within 3 percent of the values observed for the batteries without the thermal fuse. It can be concluded that continuous discharge performance at a current drain of approximately 80 mA is not adversely affected by the presence of the thermal fuse.

3. Galvanostatic Pulsed Discharge at 0.45 Amps

Galvanostatic pulsed discharge at 0.45 amps, 10 percent duty cycle (3 seconds on, 27 seconds off), to a 3.5 volt cutoff, was employed to evaluate batteries with and without the thermal fuse. Two batteries of each type were tested. These test conditions were selected to simulate a typical flash/charging cycle in a camera. Average values of the test data for each pair of batteries in fact favored the batteries employing the thermal fuse for three critical parameters. Load voltage was 5 percent higher; charge extracted was 8 percent higher; and energy extracted was 14 percent higher for batteries employing the thermal fuse compared to the batteries without the thermal fuse. It can be concluded that galvanostatic discharge performance at 0.45 amps, 10 percent duty/cycle is not adversely affected by the presence of the thermal fuse.

The foregoing data demonstrate the separator assembly containing the thermal fuse providing thermal control of the battery when shorted, and is not detrimental to battery electrical performance at moderate current continuous drain or high current pulsed drain.

PERFORMANCE OF BATTERIES HAVING PARTICULATE THERMAL FUSE

This example demonstrates the performance of batteries comprising a separator assembly having particulate wax particles as the thermal fuse similar to the thermal fuse of U.S. Pat. No. 4,075,400.

A different wax was used in this comparative example (m.p. 64° C.) than that used in the exemplified batteries of this invention. The wax used was lower melting and was expected to shut the battery down sooner than a higher melting wax. However, we have no reason to believe that it would adversely affect the electrical properties of the battery.

Also note that this comparative example employed a commercially prepared prelaminate of a non-woven polypropylene fabric and a microporous polypropylene onto which the wax was sprayed. Such a separator assembly is quite similar to that prepared in the foregoing example by pressurelaminating the waxed nonwoven fabric to microporous Celgard TM 2500. In the present example, however, the wax particles were not fused.

A. FABRICATION

A 3.18 cm (1.25 inch) wide strip of separator fabric (Celgard TM 4510) was coated with a 50:50 (wt) mixture of Candellila wax and Tissue Prep ®. The wax was applied, using the spray method described previously herein, to the non-woven side of the Celgard separator. No fusing step was used to melt the wax. By this technique it was observed that the wax particulates were not confined to the non-woven fabric fibers.

The separator containing the particulate wax, (about 20 gm/m$^2$), was pressure laminated onto the surface of a lithium anode with the waxed layer facing the lithium. A series of such anodes was combined with the previously described MnO$_2$ cathodes. The combinations were made into batteries as previously described.

B. ELECTRICAL BEHAVIOR

1. Shorting

Sample batteries with the separator containing particulate wax as described above were shorted through a 0.04 ohm lead and both skin temperature and current were monitored. The skin temperature rose only to 68° C. with a strong truncation of the current noted due to presence of the wax particles. The batteries did not swell or vent.

2. Continuous Discharge Through 90 ohm (Ω)

Batteries prepared just as those for the shorting test above were discharged through a 90 ohm load to a 6 volt cutoff. The average values for service life and energy delivered were 10–15 percent below the values obtained for batteries having the separator assembly used in the present invention.

The foregoing data show that batteries comprising the separator assembly of the invention unexpectedly improve the load voltage, service life and the energy extracted from a battery when pulse discharged compared to batteries in which a separator is used without a thermal fuse. One skilled in the art would have expected greater internal battery resistance and a degradation of battery performance due to the presence of the thermal fuse.

Moreover, the batteries comprising the separator or assembly of this invention do not suffer the battery performance losses which occur in batteries using the particulate wax poisoning agents of U.S. Pat. No. 4,075,400.

In contrast, the example of the batteries of this invention required application of the wax to the fibers of a non-woven fabric followed by fusing. While not wishing to be bound to a proposed explanation of the unexpected advantages from the present invention, fusing is believed to cause the wax to adhere to the fibers. Thus, any method which adheres the wax to the fibers will be useful in making the separator assembly of this invention.

The invention has been described in detail with particular reference to preferred embodiments thereof, but it will be understood that variations and modifications can be effected within the spirit and scope of the invention.

We claim:

1. A separator assembly for use in batteries comprising a film bearing a thermal fuse in the form of a layer of wax coated fibers; wherein said assembly is sufficiently porous to allow continuous flow of ions in the battery.

2. The separator assembly of claim 1 wherein both the film and the thermal fuse is porous.

3. The separator assembly of claim 2 or 1 wherein the film is microporous.

4. The separator assembly of claim 2 or 1 wherein the wax has a melting point of 50° to 150° C.

5. The separator assembly of claim 2 or 1 wherein the wax is selected from the group consisting of
   (a) a mixture of paraffin and a thermoplastic polymer,
   (b) beeswax,
   (c) microcrystalline wax,
   (d) candellila wax,
   (e) rice bran wax,
   (f) polyethylene wax, and
   (g) polypropylene wax.

6. A battery comprising an anode, a cathode, an electrolyte and a separator assembly between the anode and the cathode; wherein the separator assembly (a) comprises a film bearing a thermal fuse in the form of a layer of wax coated fibers and (b) is sufficiently porous to allow continuous flow of ions in said battery.

7. The battery of claim 6 comprising a lithium anode.

8. The battery of claim 6 comprising a $MnO_2$ cathode.

9. The battery of claim 7, 8 or 6 wherein the separator assembly is porous.

10. The battery of claim 7, 8, 9 or wherein the wax is selected from the group consisting of
(a) a mixture of paraffin and a thermoplastic polymer,
(b) beeswax,
(c) microcrystalline wax,
(d) candellila wax,
(e) rice bran wax,
(f) polyethylene wax, and
(g) polypropylene wax.

11. The battery of claim 7, 8, 9 or 6 wherein the wax has a melting point in the range of 50° to 150° C.

12. A battery comprising a lithium anode, an $MnO_2$ cathode, an electrolyte comprising 1M $LiBF_4$ in a solvent mixture of butyrolactone and dimethoxyethane and a separator assembly between the anode and cathode; wherein the separator assembly comprises a porous film bearing a thermal fuse in the form of a porous layer of wax coated fibers.

13. A battery comprising a lithium anode, an $MnO_2$ cathode, an electrolyte comprising 1M $LiCF_3SO_3$ in a solvent mixture of butyrolactone and dimethoxyethane and a separator assembly between the anode and the cathode; wherein the separator assembly comprises a porous film bearing a thermal fuse in the form of a porous layer of wax coated fibers.

* * * * *

UNITED STATES PATENT OFFICE
CERTIFICATE OF CORRECTION

PATENT NO. : 4,741,979
DATED : May 3, 1988
INVENTOR(S) : Marilyn A. Faust et al.

It is certified that error appears in the above-identified patent and that said Letters Patent are hereby corrected as shown below:

Column 7, line 11 the part reading

"claim 7, 8, 9 or wherein"

should read

--claim 7, 8, 9 or 6 wherein --

Signed and Sealed this

Twentieth Day of September, 1988

Attest:

DONALD J. QUIGG

*Attesting Officer*  *Commissioner of Patents and Trademarks*